United States Patent
Kuwana et al.

(10) Patent No.: US 9,140,620 B2
(45) Date of Patent: Sep. 22, 2015

(54) PRESSURE TRANSMITTER AND TRANSMISSION METHOD

(71) Applicant: HITACHI, LTD., Tokyo (JP)

(72) Inventors: Ryo Kuwana, Tokyo (JP); Atsushi Baba, Tokyo (JP); Atsushi Fushimi, Tokyo (JP); Daisuke Shinma, Tokyo (JP); Hideki Hanami, Tokyo (JP); Isao Hara, Tokyo (JP); Takashi Ito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 104 days.

(21) Appl. No.: 14/024,811

(22) Filed: Sep. 12, 2013

(65) Prior Publication Data
US 2014/0096613 A1    Apr. 10, 2014

(30) Foreign Application Priority Data

Oct. 5, 2012   (JP) .................................. 2012-222647
Feb. 15, 2013  (JP) .................................. 2013-027260

(51) Int. Cl.
*G01L 7/08*   (2006.01)
*G01L 13/02*  (2006.01)
*G01L 19/06*  (2006.01)

(52) U.S. Cl.
CPC .................. *G01L 13/025* (2013.01); *G01L 7/08* (2013.01); *G01L 13/026* (2013.01); *G01L 19/0636* (2013.01); *G01L 19/0645* (2013.01)

(58) Field of Classification Search
USPC .................................................. 73/700–756
See application file for complete search history.

(56) References Cited

U.S. PATENT DOCUMENTS

| 5,837,158 A | 11/1998 | Shepodd et al. | |
|---|---|---|---|
| 2005/0126296 A1* | 6/2005 | Hedtke | 73/706 |
| 2006/0248958 A1* | 11/2006 | Betzner | 73/754 |
| 2008/0186506 A1 | 8/2008 | Lopushansky | |
| 2010/0083731 A1* | 4/2010 | Hedtke | 73/1.57 |
| 2010/0083768 A1* | 4/2010 | Hedtke et al. | 73/724 |
| 2013/0312531 A1* | 11/2013 | Hedtke | 73/715 |
| 2015/0107364 A1* | 4/2015 | Kuwana et al. | 73/715 |
| 2015/0107365 A1* | 4/2015 | Arita et al. | 73/715 |

FOREIGN PATENT DOCUMENTS

| DE | 10 2004 060 647 B4 | 10/2005 |
|---|---|---|
| DE | 600 31 869 T2 | 9/2007 |

(Continued)

OTHER PUBLICATIONS

German Office Action dated Oct. 21, 2013 with partial English translation.

*Primary Examiner* — Andre Allen
(74) *Attorney, Agent, or Firm* — Baker Botts L.L.P.

(57) ABSTRACT

Hydrogen which has entered into a pressure/differential pressure transmitter from external or internally generated hydrogen and hydrocarbons are converted to air bubbles within pressure guide paths. As a result, the indicated value drifts and an accurate numerical value is not output. A pressure/differential pressure transmitter includes a space formed between a diaphragm and a main body side wall face, pressure guide paths connected to the main body side wall face, a sealed liquid sealed in the space and the pressure guide paths to transmit a pressure received by the diaphragm to a sensor, and a hydrogen absorption material provided at least in the sealed liquid, on the main body side wall face, or in a part of a path between the main body side wall face and the sensor to absorb hydrogen atoms in the sealed liquid.

19 Claims, 10 Drawing Sheets

(56) References Cited

FOREIGN PATENT DOCUMENTS

| JP | 9-113394 A | 5/1997 |
| JP | 2002-71494 A | 3/2002 |
| JP | 2003-326592 A | 11/2003 |
| JP | 2005-114453 A | 4/2005 |

* cited by examiner

PRESSURE TRANSMITTER AND TRANSMISSION METHOD

BACKGROUND OF THE INVENTION

The present invention relates to a pressure transmitter and transmission method, and in particular to a pressure transmitter and transmission method suitable for measuring a fluid pressure or a pressure difference between two points in an atomic power plant, an oil refining plant, and a chemical plant and transmitting a detected signal.

The pressure/differential pressure transmitter transfers a fluid pressure received by a diaphragm to a sensor by using a sealed liquid sealed in a pressure guide path and transmits an electric signal detected by the sensor to the external. There are pressure transmitters that measure an absolute pressure and pressure transmitters that measure a differential pressure.

These pressure/differential pressure transmitters are used in atomic power plants, oil refining plants and the like. From the viewpoint of securing the safety of plants and product quality, for example, a precision of ±1% is demanded. However, it is difficult to keep the precision over a long term by influence of hydrogen transmitted from the outside of the pressure/differential pressure transmitter.

In other words, a part of hydrogen (hydrogen molecules, hydrogen atoms, and hydrogen ions) contained in a measurement fluid is transmitted by the diaphragm and then accumulated as air bubbles in a sealed liquid filled in a pressure guide path. As a result, the pressure within the pressure guide path rises and it becomes impossible to properly transmit a change of the pressure applied to the diaphragm to the sensor, resulting in a lowered precision.

Formerly, therefore, hydrogen transmitted through the diaphragm from the external is suppressed by providing an intermediate layer composed of any one or a plurality of aluminum, copper, platinum and gold that spreads nearly in parallel with the surface, within the diaphragm in a thickness direction as described in, for example, JP-A-9-113394, by making the diaphragm in a pressure receiving unit double and providing a gas trap having a sealed hydrogen absorption alloy in a gap between the double diaphragms as described in, for example, JP-A-2002-71494, or by providing a hydrogen absorption film on a sealed liquid side of a diaphragm in a pressure receiving unit.

SUMMARY OF THE INVENTION

In the above described conventional techniques, hydrogen transmitted through the diaphragm from the external is suppressed. Therefore, a countermeasure is taken only for hydrogen transmission from the external. Internally generated hydrogen and hydrocarbons or hydrogen that has been already transmitted are not considered.

If the sealed liquid filled in the pressure guide path is decomposed by radiation or heat and hydrogen or hydrocarbons are generated, those gases are accumulated in the sealed liquid. If the gases exceed a determinate quantity, the gases form air bubbles. Accordingly, the pressure within the pressure guide path in the pressure/differential pressure transmitter rises. This results in a problem that the precision of an allowable error (for example, a precision of ±1%) of the pressure/differential pressure transmitter cannot be kept. Furthermore, periodical and irregular inspections must be conducted to keep the precision, resulting in a problem of an increased maintenance work. Or furthermore, exchange becomes necessary in order to keep the precision of ±1% in the inspection, resulting in a problem of an enormous exchange expense.

The present invention has been made to solve at least one of the above-described problems. An object of the present invention is to provide a pressure transmitter and transmission method capable of reducing influence of internally generated hydrogen and hydrocarbons or hydrogen transmitted from the external.

In order to solve the problem, a pressure/differential pressure transmitter according to the present invention includes a diaphragm, a pressure receiving chamber wall face, a space formed between the diaphragm and the pressure receiving chamber wall face, pressure guide paths connected to the pressure receiving chamber wall face, a sealed liquid sealed in the space and the pressure guide paths to transmit a pressure received by the diaphragm to a sensor, and a hydrogen absorption material provided at least in the sealed liquid, on the pressure receiving chamber wall face, or in a part of a path between the pressure receiving chamber wall face and the sensor to absorb hydrogen atoms in the sealed liquid.

According to the present invention, especially the influence of internally generated hydrogen and hydrocarbons, or hydrogen transmitted from the external can be reduced by absorbing them using a hydrogen absorption material. In other words, it becomes possible to keep an allowable error precision (for example, a precision of ±1%) of the pressure/differential pressure transmitter over a long term, and the life of the pressure/differential pressure transmitter can be prolonged.

DESCRIPTION OF THE EMBODIMENTS

Hereafter, embodiments of the present invention will be described. A pressure/differential pressure transmitter according to a first embodiment will be described in detail with reference to FIGS. 1 to 8.

<<Embodiment 1>>

Figure 1:
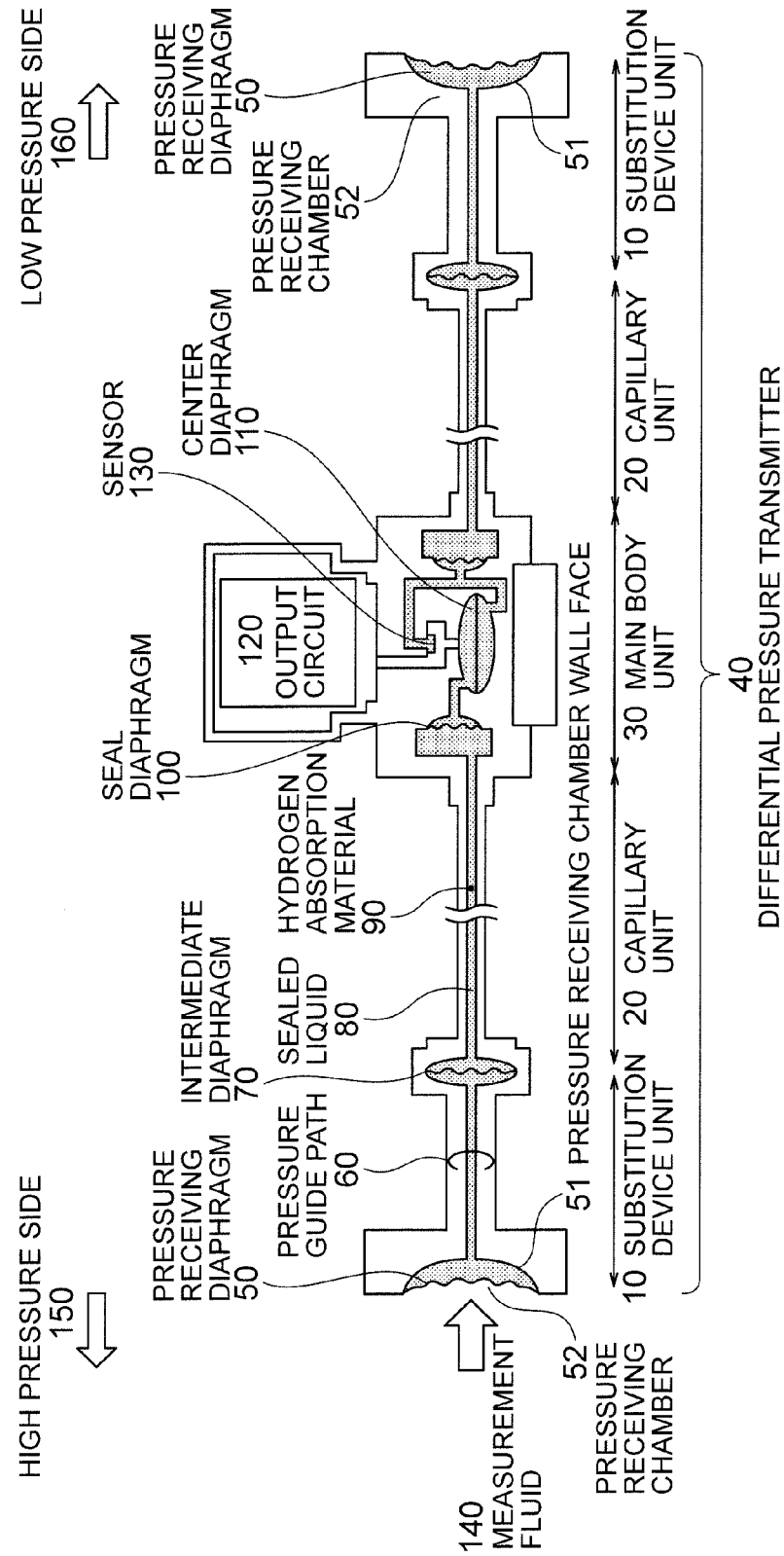
FIG. 1 is an explanation diagram of a differential pressure transmitter in a pressure/differential transmitter according to a first embodiment of the present invention.

FIG. 1 is an explanation diagram of a differential pressure transmitter in a pressure/differential transmitter according to a first embodiment of the present invention.

In FIG. 1, a differential pressure transmitter 40 for measuring a differential pressure includes a substitution device unit 10, a capillary unit 20, and a main body unit 30. Pressure of a measurement fluid 140 is received by two pressure receiving diaphragms 50. The pressure is conveyed as far as a sensor 130 by a sealed liquid 80 sealed in pressure guide paths 60 via an intermediate diaphragm 70, a seal diaphragm 100, and a center diaphragm 110. The pressure received by the sensor 130 is input to an output circuit 120. A pressure value is output.

The substitution device unit 10 will now be described. A pressure receiving chamber 52 is a place formed by being surrounded by the pressure receiving diaphragm 50 and a pressure receiving chamber wall face 51. The pressure of the measurement 140 is first received by the pressure receiving diaphragm 50, transferred to the sealed liquid stored in the pressure receiving chamber 52, and further transferred to the sealed liquid in the pressure guide paths 60.

Although detailed description is omitted, the idea concerning the diaphragm 50 that the pressure receiving chamber is formed by the diaphragm and the pressure receiving chamber wall face is applied to the intermediate diaphragm 70 and the seal diaphragm 100 as well.

In the above-described configuration, all places where the sealed liquid is sealed not only between the pressure receiving diaphragm 50 and the intermediate diaphragm 70 but also between regions among the intermediate diaphragm 70, the seal diaphragm 100, the center diaphragm 100, and the sensor 130 are the pressure guide paths 60.

It is known that in the above-described configuration, hydrogen transmitted from the external of the differential pressure transmitter 40 is converted to air bubbles in the sealed liquid and a resultant rise in the internal pressure of the pressure guide paths 60 makes it impossible to properly transfer a change of pressure applied to the pressure receiving diaphragm 50 to the sensor 130, resulting in a lowered measurement precision. Specifically, in cases where a gas quantity converted to air bubbles within the pressure guide paths 60 on a high pressure side 150 differs from that on a low pressure side 160, the pressure value varies from a normal value.

In addition, it is found as a new problem that even if hydrogen and hydrocarbons are internally generated and converted to air bubbles because of radiation decomposition or thermal decomposition of the sealed liquid, the pressure within the pressure guide paths 60 rises and the detection precision of the sensor 130 is degraded. By the way, the hydrocarbons are methane, ethane, propane, and the like.

Hydrogen transmitted from the external or internally generated hydrogen and hydrocarbons are converted to air bubbles if a solubility amount of the sealed liquid 80 within the pressure guide paths 60 is exceeded. In addition, as the pressure of the measurement object of the pressure transmitter approaches the vacuum, air bubbles appear remarkably because the solubility amount decreases.

In the above-described configuration, the differential pressure transmitter 40 can prevent the pressure rise within the pressure guide paths 60 caused by storage of hydrogen and hydrocarbons as air bubbles, by absorbing both hydrogen transmitted from the external of the differential pressure transmitter 40, and internally generated hydrogen and hydrogen atoms in hydrocarbons with a hydrogen absorption material 90 sealed within the pressure guide paths 60 or installed on an internal wall face in the pressure guide paths 60. Here, the pressure guide paths 60 mean portions between the two pressure receiving diaphragms in which the sealed liquid 80 is sealed, and the pressure guide paths 60 are illustrated deep in FIG. 1.

Figure 2:
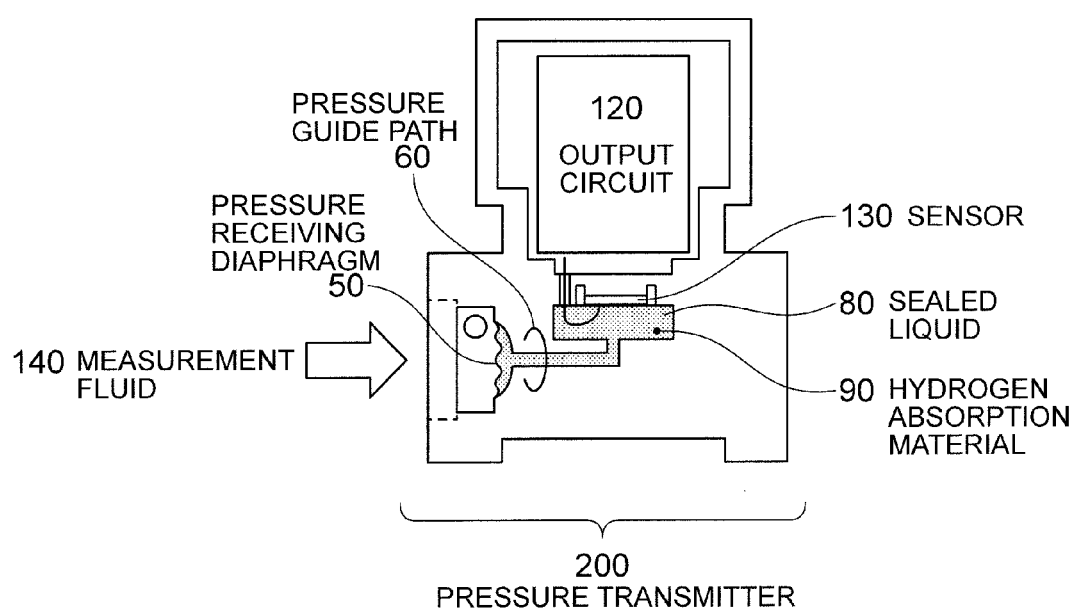
FIG. 2 is an explanation diagram of a pressure transmitter.

FIG. 2 shows an explanation diagram of a pressure transmitter. In FIG. 2, a pressure transmitter 200 for measuring an absolute pressure receives a pressure of the measurement fluid 140 with a pressure receiving diaphragm 50 and conveys the pressure to a sensor 130 by using a sealed liquid 80 sealed in the pressure guide paths 60. The pressure received by the sensor 130 is input to an output circuit, and output as a pressure value.

If in the above-described configuration of the pressure transmitter 200 hydrogen transmitted from the external of the pressure transmitter 200 or internally generated hydrogen and hydrocarbons is converted to air bubbles, the pressure within the pressure guide paths 60 varies from a normal value in the same way as FIG. 1. Here, the pressure rise within the pressure guide paths 60 caused by conversion of hydrogen and hydrocarbons to air bubbles by absorbing both hydrogen and hydrogen atoms in hydrocarbons with the hydrogen absorption material 90 sealed within the pressure guide paths 60 or installed on an internal wall face in the pressure guide paths 60 in the same way as FIG. 1.

Figure 3:
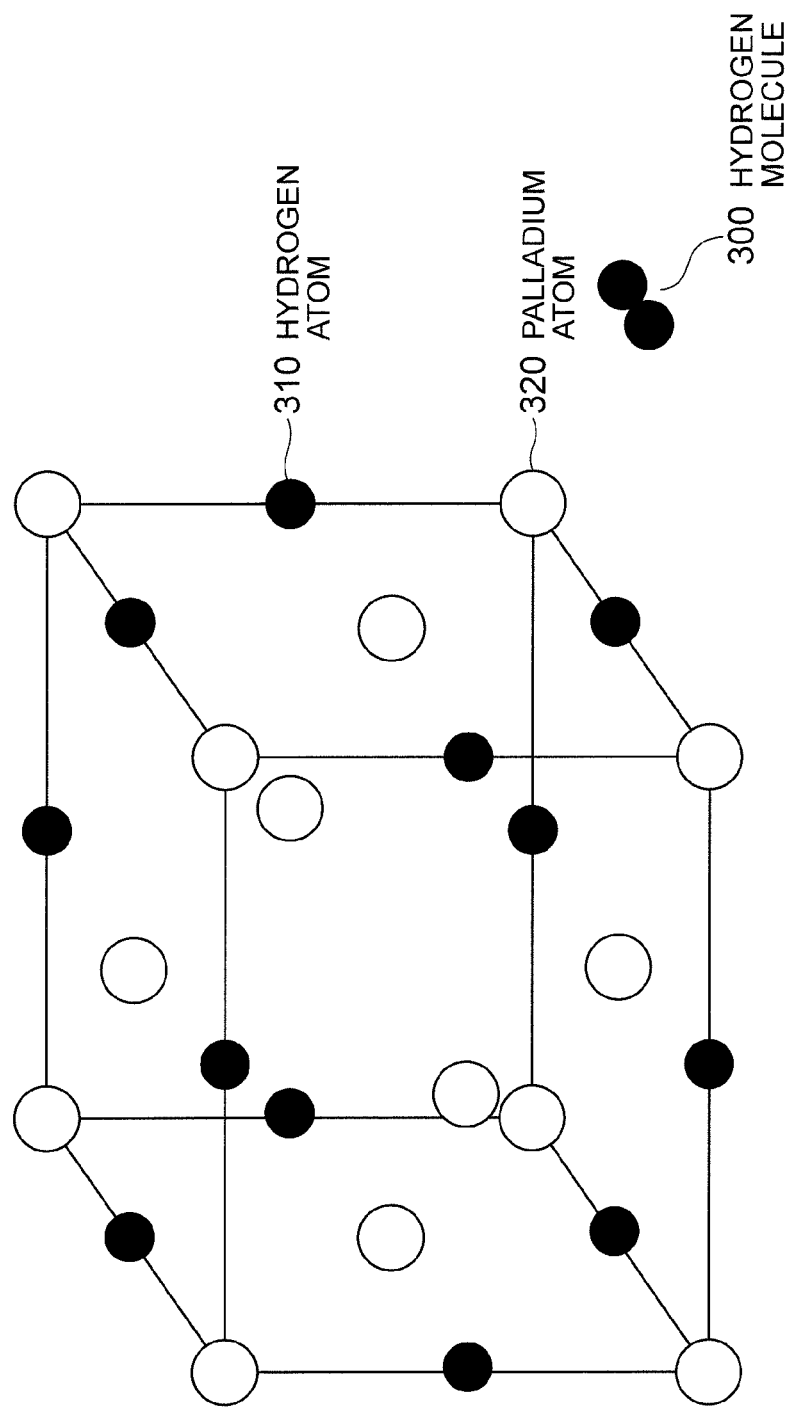
FIG. 3 is an explanation diagram showing a hydrogen absorption method using a hydrogen absorption material.

FIG. 3 shows a hydrogen absorption effect brought about by a hydrogen absorption material. In FIG. 3, an image diagram of hydrogen absorption using palladium is shown as an example of the hydrogen absorption material 90. By the way, the hydrogen absorption material 90 may be magnesium, vanadium, titanium, manganese, zirconium, nickel, niobium, cobalt, calcium, or an alloy of them besides palladium.

Figure 4:
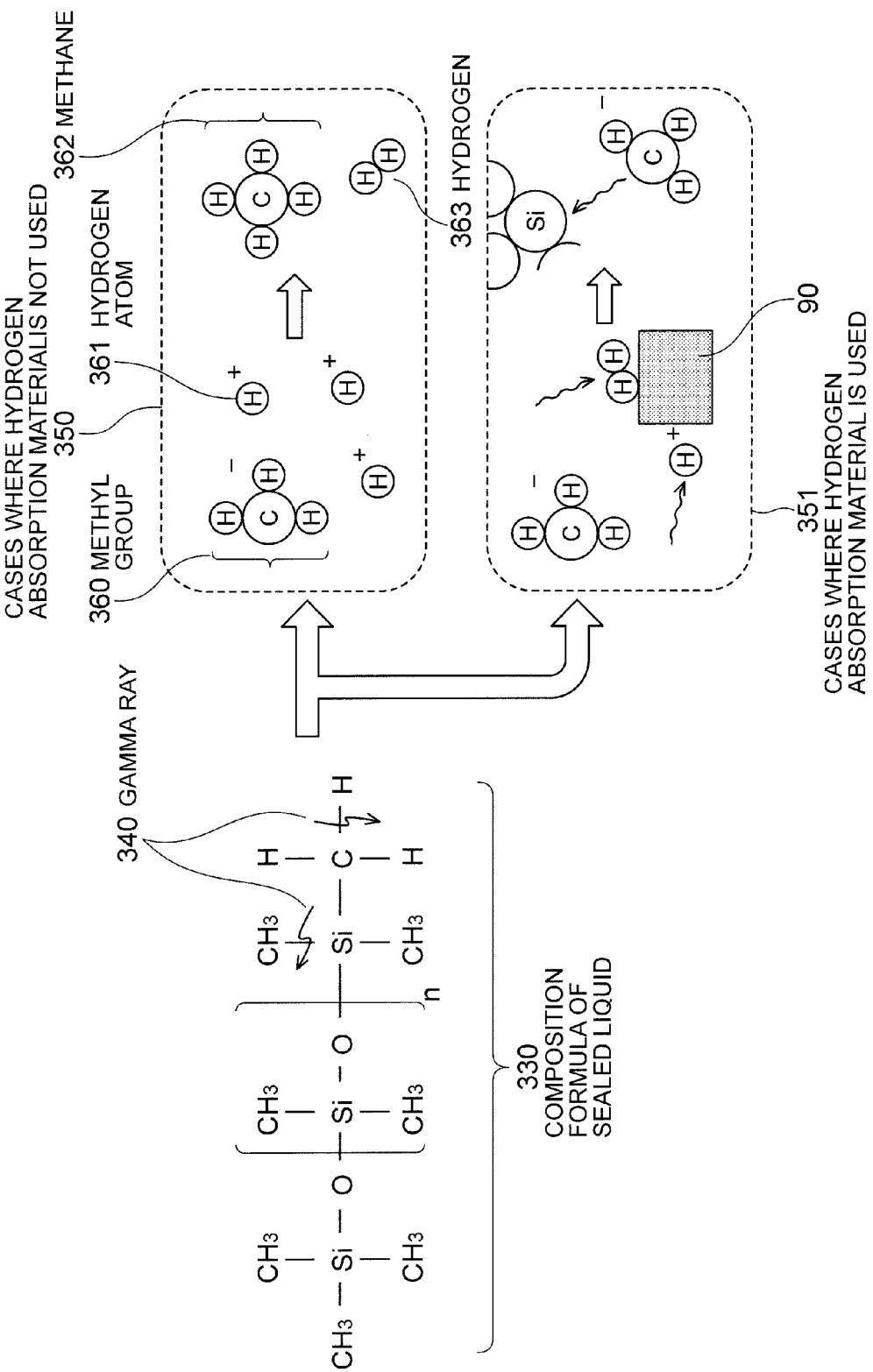
FIG. 4 is an explanation diagram showing a method for absorbing hydrogen in a sealed liquid decomposed by radiation, by using the hydrogen absorption material.

Palladium is a face-centered cubic lattice. Hydrogen molecules 300 are absorbed between palladium atoms as hydrogen atoms 310. By the way, it is known that palladium absorbs hydrogen having a volume which is 935 times that of palladium itself. FIG. 4 shows an explanation diagram of a method for absorbing hydrogen in the sealed liquid 80 decomposed by radiation, by using the hydrogen absorption material.

In FIG. 4, the method will be described as to methane 362 and hydrogen 363 as an example. As for the sealed liquid 80, C—H bonds and Si—C bonds in composition formula 330 of the sealed liquid are broken by radiation such as gamma rays. Resultant methyl groups 360 and hydrogen atoms 361 are bonded together to generate methane 362 and hydrogen 363 in a case 350 in which the hydrogen absorption material is not used.

On the other hand, in a case in which the hydrogen absorption material is used, the disconnected hydrogen atoms 361 are absorbed to the hydrogen absorption material 90. Accordingly, the amount of bonds between the methyl groups 360 and the hydrogen atoms 361 decreases. As a result, the generation amount of the methane 362 can be suppressed. The methyl groups 360 that are not bonded to the hydrogen atoms 361 returns to the sealed liquid again. As a result, the pressure rise within the pressure guide paths 60 caused by accumulation of hydrocarbons such as the methane 362 as air bubbles can be prevented.

Figure 5:
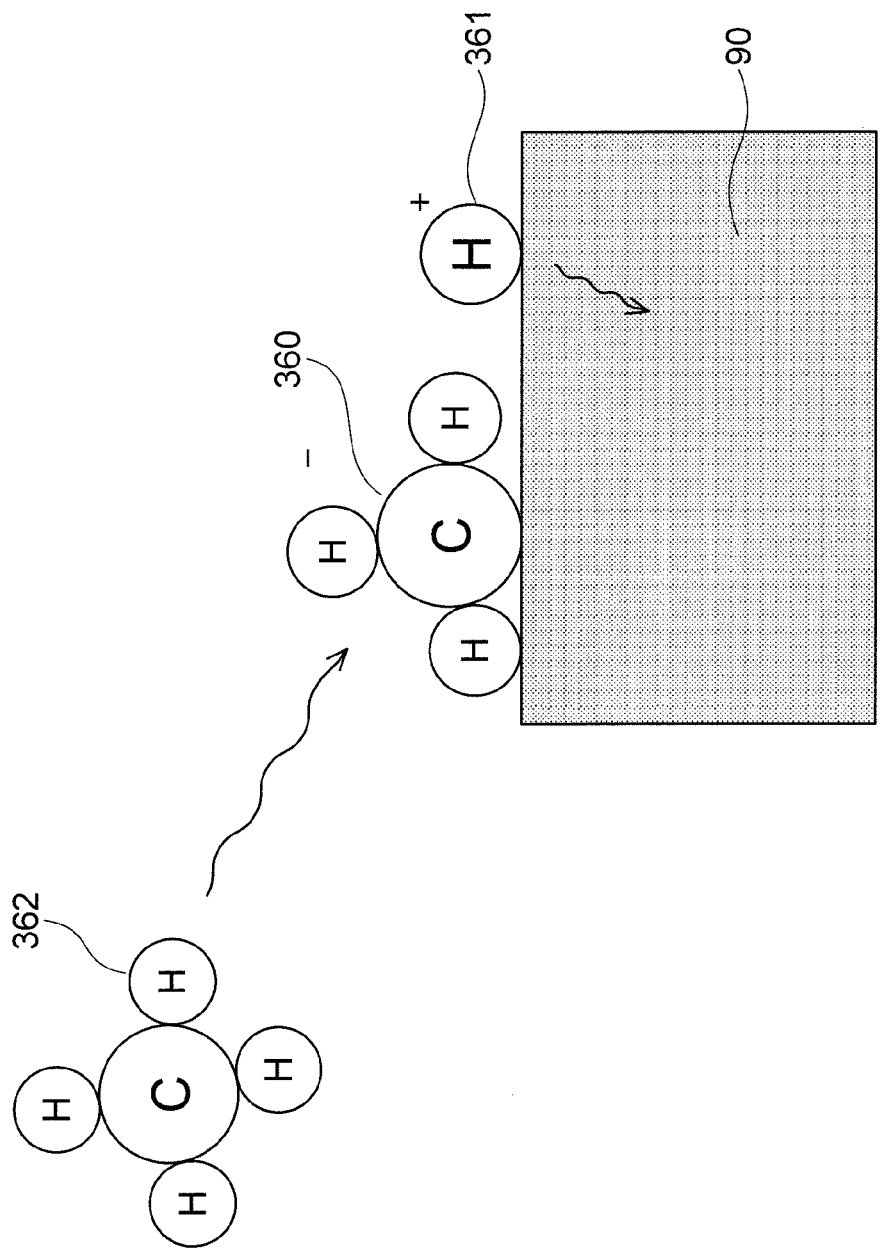
FIG. 5 is an explanation diagram showing a method for absorbing hydrogen atoms in hydrocarbons by using a hydrogen absorption material.

FIG. 5 is an explanation diagram showing a technique for absorbing hydrogen atoms in hydrocarbons by using the hydrogen absorption material. In FIG. 5, the technique will be described as to the methane 362 as an example. Parts of the methyl groups 360 and hydrogen atoms 361 are bonded together to form the methane 362. If the methane 362 comes in contact with the surface of the hydrogen absorption material 90 thereafter, the methane 362 dissociates into the methyl groups 360 and the hydrogen atoms 361. The hydrogen atoms 361 are absorbed by the hydrogen absorption material 90, and the methyl groups 360 finally become carbon atoms and are absorbed to the surface of the hydrogen absorption material. As a result, the pressure rise within the pressure guide path 60 caused by accumulation of hydrocarbons such as the methane 362 as air bubbles can be prevented.

By installing such a hydrogen absorption material 90 within the pressure guide paths 60 or on a wall face of the pressure guide paths 60 in the pressure/differential pressure transmitter, hydrogen transmitted from the external of the pressure/differential pressure transmitter or internally generated hydrogen and hydrogen atoms in hydrocarbons can be absorbed up to an amount of 935 times the volume of the hydrogen absorption material 90. As a result, the internal pressure rise caused by caused by conversion of hydrogen and hydrocarbons to air bubbles within the pressure guide path can be suppressed.

Figure 6:
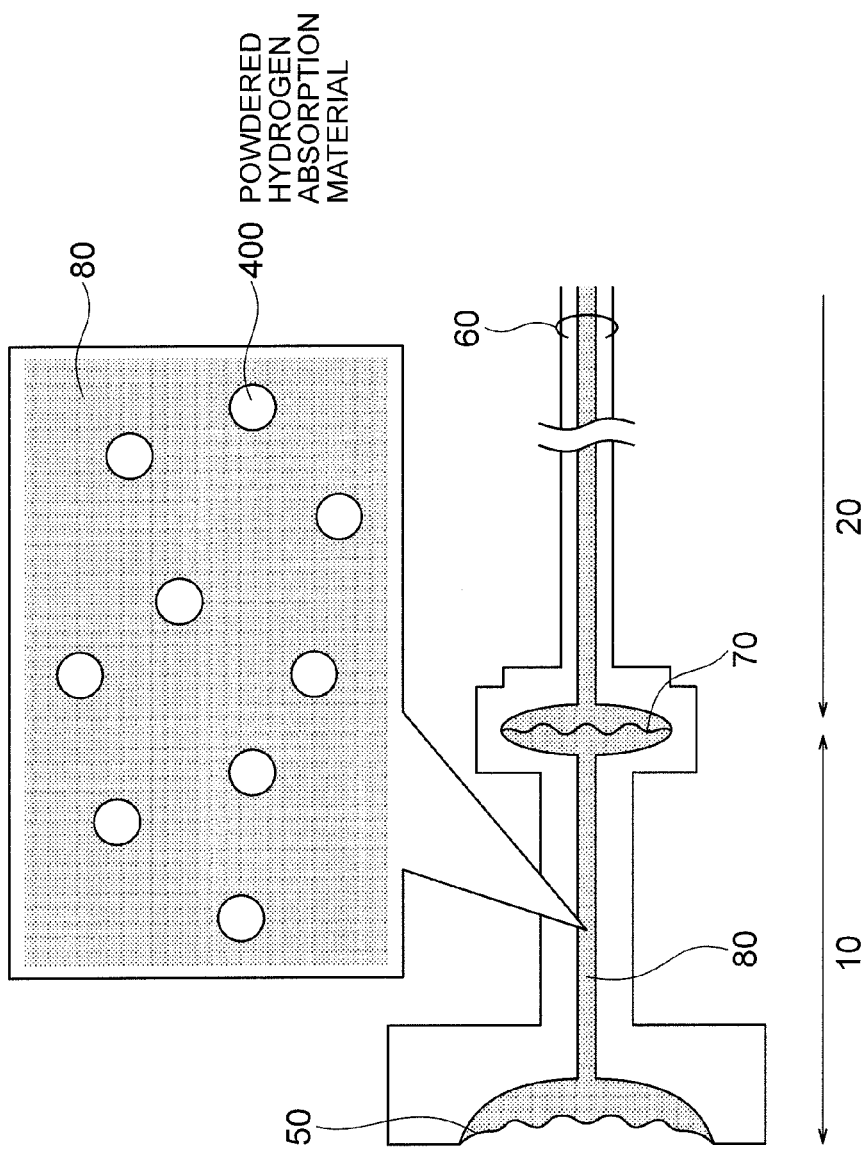
FIG. 6 is an explanation diagram of a differential pressure transmitter using a powdered hydrogen absorption material.

FIG. 6 shows a differential pressure transmitter in which a powdered hydrogen absorption material is sealed within the pressure guide path. As for seal places of a powdered hydrogen absorption material 400, it is desirable to seal it into the pressure guide paths 60 respectively in the substitution device unit 10, the capillary unit 20, and the main body unit 30. However, the seal place may be only the substitution device unit 10, or may be only the substitution device unit 10 and the capillary unit 20. In the pressure transmitter 200 as well, the powdered hydrogen absorption material 400 is sealed within the pressure guide paths 60 in the same way as the differential pressure transmitter 40.

In the above-described configuration, the powdered hydrogen absorption material 400 mixes with the sealed liquid 80 and becomes a colloidal liquid. If particles of the powdered hydrogen absorption material 400 are large at this time, the particles are deposited. However, the deposition can be prevented by making the diameter of the particles equal to 0.1 μm or less. Furthermore, as the particle diameter becomes small, the area of contact between the powdered hydrogen absorption material 400 and hydrogen becomes wide and consequently the hydrogen absorption speed can be quickened. Owing to the powdered hydrogen absorption material 400, it is possible to absorb hydrogen transmitted from the external of the pressure/differential pressure transmitter or internally generated hydrogen and hydrogen atoms in hydrocarbons and suppress the internal pressure rise caused by conversion of hydrogen and hydrocarbons in the pressure guide path to air bubbles.

Figure 7:
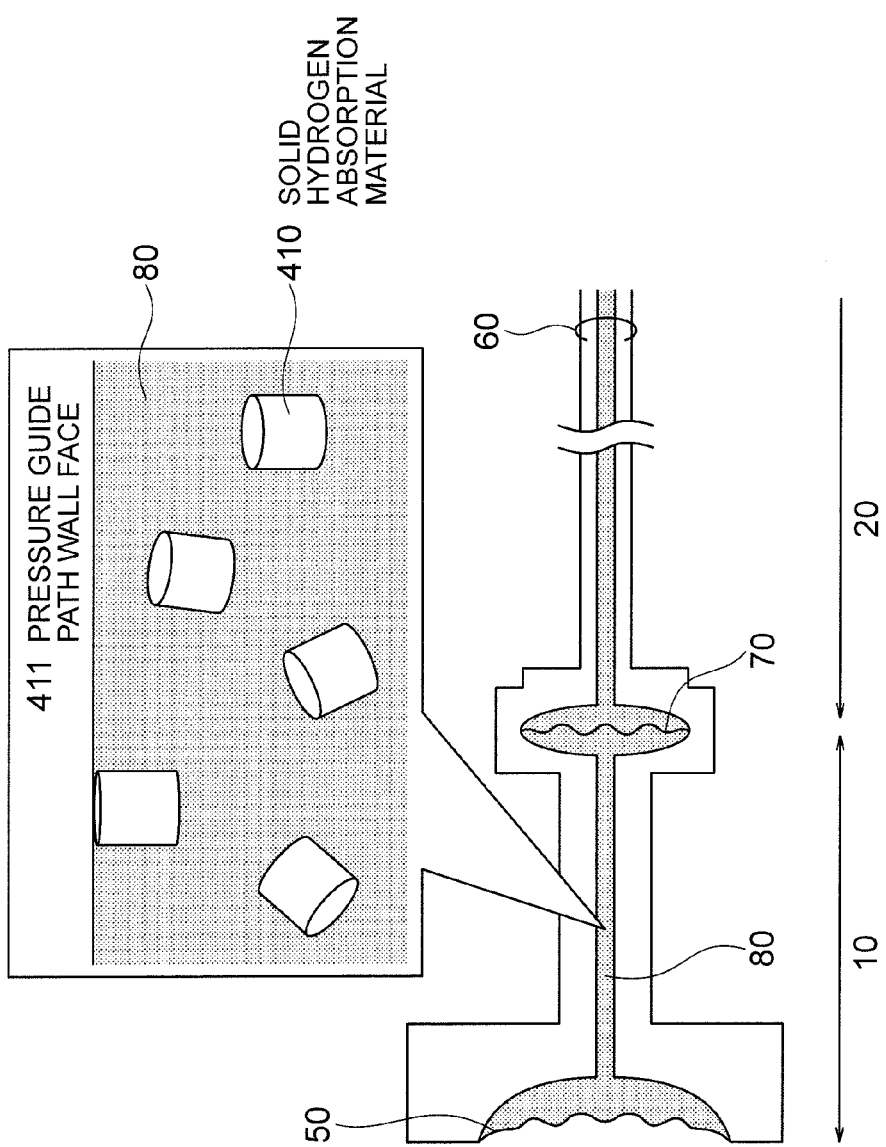
FIG. 7 is an explanation diagram of a differential pressure transmitter using a solid hydrogen absorption material.

FIG. 7 shows a differential pressure transmitter using a solid hydrogen absorption material. The solid hydrogen absorption material 410 is also sealed in a place within any one of the pressure guide paths 60 in the differential pressure transmitter 40 or places composed of a combination of them, in the same way as the powdered hydrogen absorption material 400 shown in FIG. 6. In the pressure transmitter 200 as well, the solid hydrogen absorption material 410 is sealed within the pressure guide paths 60 in the same way as the differential pressure transmitter 40. Here, the solid hydrogen absorption material 410 may take a shape of pellet, may take a shape of board, or may take a shape of a ball.

Furthermore, if the solid hydrogen absorption material 410 is made porous, the area of contact with hydrogen and hydrocarbons can be made wide. Therefore, hydrogen atoms can be absorbed more efficiently than, for example, the pellet formed hydrogen absorption material with the same volume.

In the above-described configuration, the solid hydrogen absorption material 410 may be mixed with the sealed liquid 80 within the pressure guide paths 60. If the solid hydrogen absorption material 410 is fixed to a wall face 411 in the pressure guide paths by welding, it is possible to prevent the solid hydrogen absorption material 410 from striking against each diaphragm such as the pressure receiving diaphragm 50 or the intermediate diaphragm 70 or the pressure guide path wall face 411 and deteriorating them.

Owing to these solid hydrogen absorption materials 410, it is possible to absorb hydrogen transmitted from the external of the pressure/differential pressure transmitter or internally generated hydrogen and hydrogen atoms in hydrocarbons and suppress the internal pressure rise caused by conversion of hydrogen and hydrocarbons in the pressure guide path to air bubbles.

Figure 8:
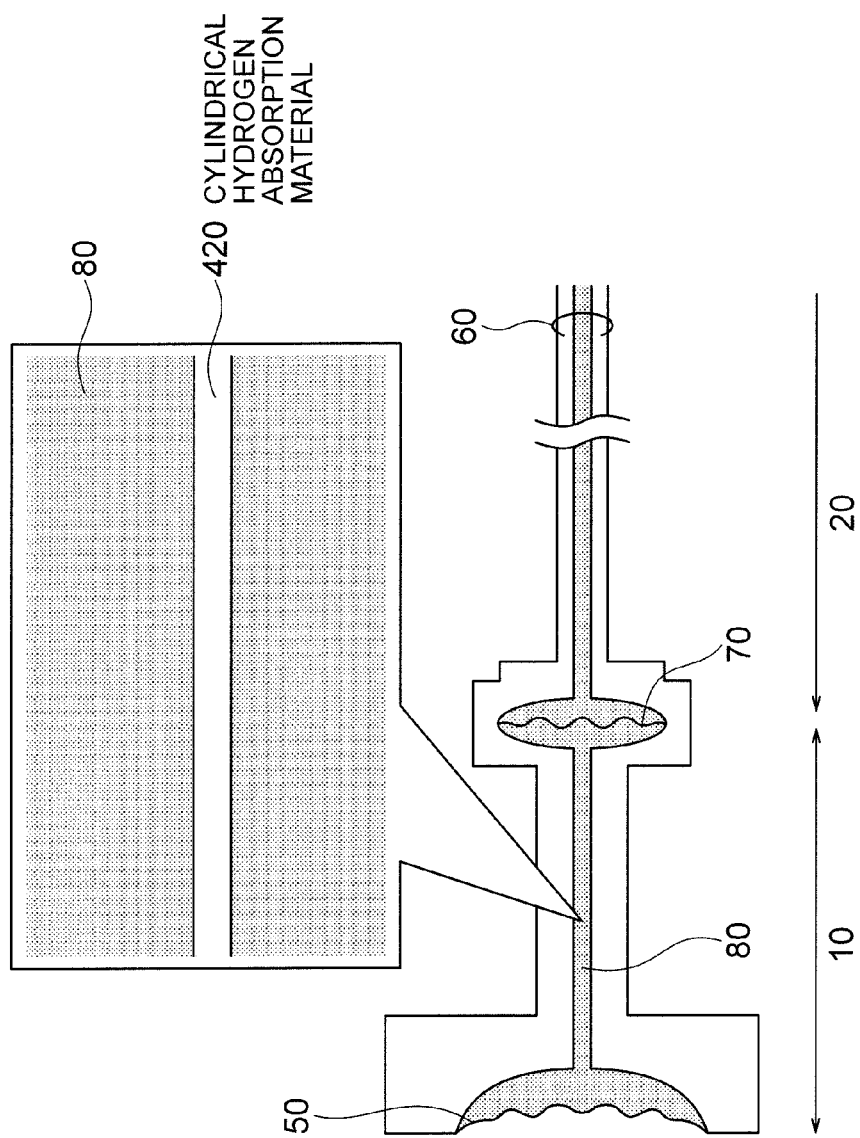
FIG. 8 is an explanation diagram of a differential pressure transmitter using a cylindrical solid hydrogen absorption material.

FIG. 8 shows a differential pressure transmitter using a cylindrical hydrogen absorption material. A cylindrical hydrogen absorption material 420 is also sealed in a place within any one of the pressure guide paths 60 in the differential pressure transmitter 40 or places composed of a combination of them, in the same way as the powdered hydrogen absorption material 400 shown in FIG. 6. In the pressure transmitter 200 as well, the cylindrical hydrogen absorption material 420 is sealed within the pressure guide paths 60 in the same way as the differential pressure transmitter 40.

In the above-described configuration, the cylindrical hydrogen absorption material 420 may take a shape of a wire. Or absorption of hydrogen may be facilitated by pushing and widening the wire and making the area wider. Furthermore, the area of contact with hydrogen may be further widened by making the cylindrical hydrogen absorption material 420 porous. The cylindrical hydrogen absorption material 420 is easy to work and the cost can be suppressed. In addition, the cylindrical hydrogen absorption material 420 can be installed easily in the capillary unit 20 or the like having a fine diameter.

In the above-described configuration, the cylindrical hydrogen absorption material 420 may be only sealed within the pressure guide paths 60. If the cylindrical hydrogen absorption material 420 is fixed to the pressure guide path wall face 411 by welding (such as plane welding or spot welding) or adhesion, however, it is possible to prevent to prevent the cylindrical hydrogen absorption material 420 from striking against each diaphragm such as the pressure receiving diaphragm 50 or the intermediate diaphragm 70 or the pressure guide path wall face 411 and deteriorating them.

<<Embodiment 2>>

In the embodiment 1, the technique of sealing the hydrogen absorption material 90 into the pressure guide paths 60 has been described. In an embodiment 2, however, a technique of installing the hydrogen absorption material 90 on the pressure guide path wall face 411 will be described.

Figure 9:
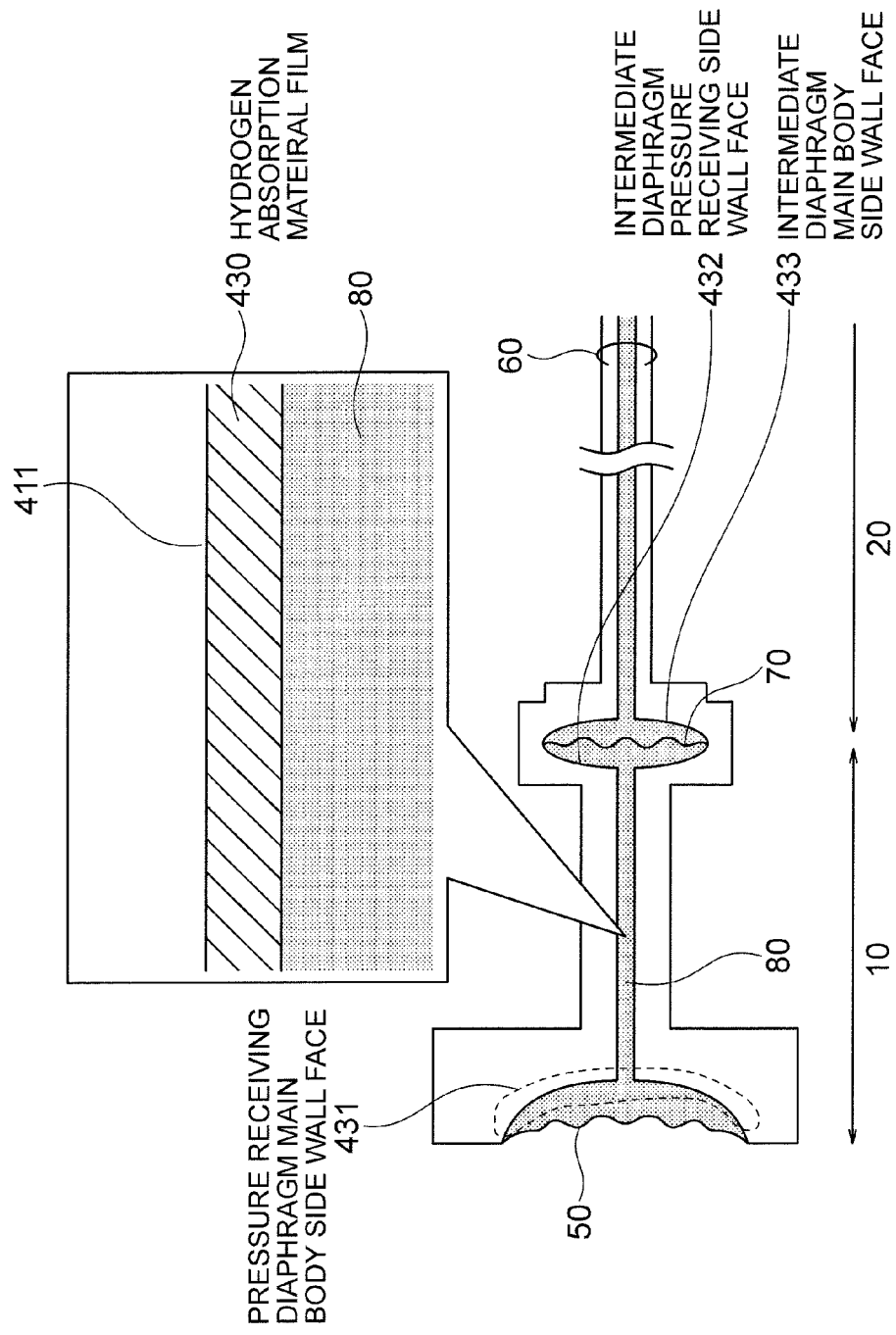
FIG. 9 is an explanation diagram of a differential pressure with a hydrogen absorption material installed on a wall face of a pressure guide path.

FIG. 9 shows a differential pressure transmitter with a hydrogen absorption material installed on the wall face of the pressure guide paths. According to the technique, a hydrogen absorption material film 430 is formed on the pressure guide path wall face 411 by plating or sputtering the hydrogen absorption material 90 on the pressure guide path wall face 411.

The present embodiment is a method for preventing pressure rise within the pressure guide paths 60 caused by conversion of hydrogen and hydrocarbons to air bubbles, by absorbing hydrogen transmitted from the external of the differential pressure transmitter 40 or internally generated hydrogen and hydrogen atoms in hydrocarbons with the hydrogen absorption material 90 in the same way as the embodiment 1. The same is true of the pressure transmitter 200 as well.

In the present embodiment, it is not necessary to change the shape or the sealed liquid 80 as compared with the conventional pressure/differential pressure transmitter. There is no possibility that the viscosity of the sealed liquid or the amount of sealed liquid will change. The possibility that the pressure measuring performance of the pressure/differential pressure transmitter itself will deteriorate can be made very small as compared with the embodiment 1.

In the above-described configuration, it is desirable to plate or sputter the hydrogen absorption material film 430 on pressure guide path wall faces 411 respectively of the substitution device unit 10, the capillary unit 20, and the main body unit 30 in the differential pressure transmitter 40. However, the place may be only the substitution device unit 10, or may be only the substitution device unit 10 and the capillary unit 20.

Besides the above-described places, the plating or sputtering places may be a pressure receiving diaphragm main body side wall face 431, an intermediate diaphragm pressure receiving side wall face 432, and an intermediate diaphragm main body side wall face 433, or a combination of them. Or the plating or sputtering places may be a sealed liquid side of the pressure receiving diaphragm 50, a pressure receiving side and a main body side of the intermediate diaphragm 70, and a pressure receiving side and a main body side of the center diaphragm 110, or a combination of them.

The present embodiment can be applied to the pressure transmitter 200 as well in the same way. The plating or sputtering place may be a sealed liquid side of the pressure receiving diaphragm 50 and a wall face of the pressure guide paths 60, or either one of them.

<<Embodiment 3>>

In an embodiment 3, a technique of absorbing hydrogen which has entered into the sealed liquid or hydrogen generated in the sealed liquid and hydrogen atoms in hydrocarbons by using a hydrogen absorption material installed on a pressure guide path wall face will be described.

Figure 10:
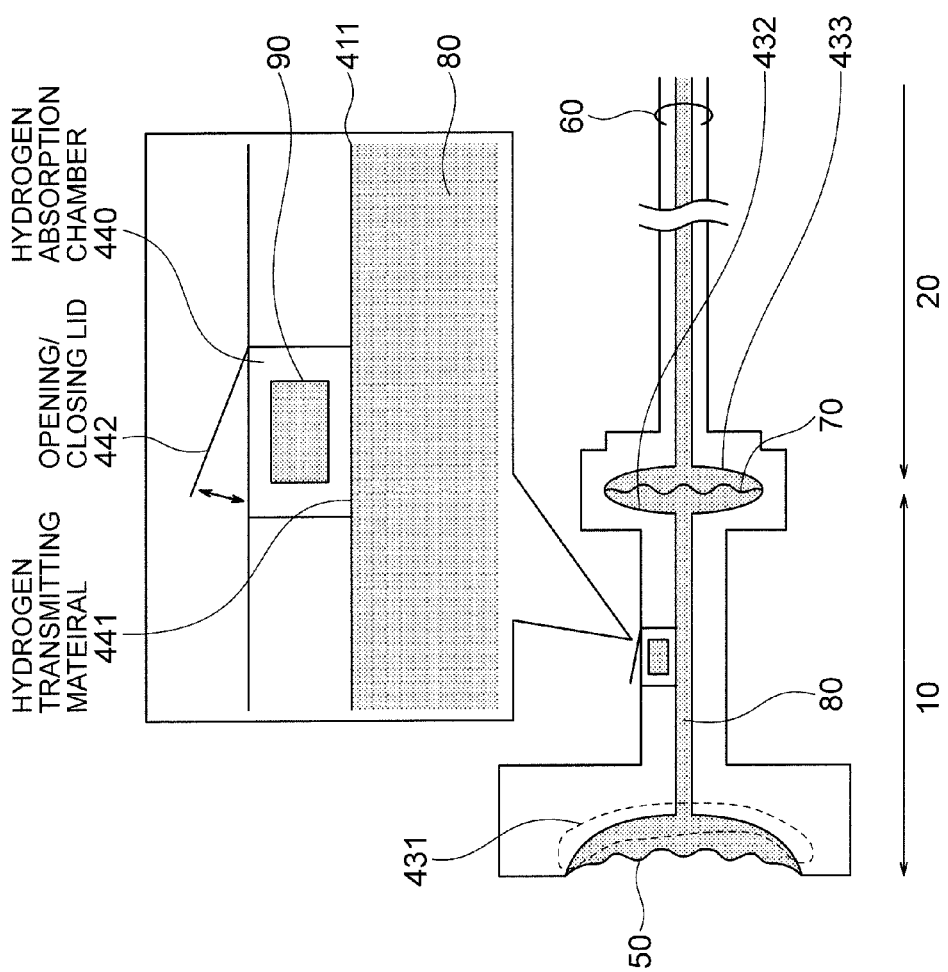
FIG. 10 is an explanation diagram of a differential pressure transmitter with a hydrogen absorption chamber installed on a wall face of a pressure guide path.

FIG. 10 shows a differential pressure transmitter having a hydrogen absorption chamber installed on a pressure guide path wall face. A hydrogen transmitting material 441 is installed on the pressure guide path wall face 411, and a hydrogen absorption chamber 440 is installed so as to cover the top of the pressure guide path wall face 411. The hydrogen absorption chamber 440 has a structure in which the hydrogen absorption material 90 is installed. Hydrogen generated within the pressure guide paths 60 or which has entered from the external is transmitted by the hydrogen transmitting material 441 from the sealed liquid 80 and moved into the hydrogen absorption chamber 440. The moved hydrogen is absorbed by the hydrogen absorption material 90 installed within the hydrogen absorption chamber 440. As a result, the internal pressure rise caused by conversion of hydrogen to air bubbles within the pressure guide paths 60 can be suppressed. In addition, an opening/closing lid 442 is installed on a top wall of the hydrogen absorption chamber 440. As a result, it becomes possible to exchange the hydrogen absorption material 90 installed within the hydrogen absorption chamber 440. Accordingly, the life of the pressure/differential pressure transmitter can be prolonged, and besides hydrogen atoms can be absorbed without a problem even in a high concentration hydrogen environment in which hydrogen cannot be fully absorbed in other embodiments.

In the above-described configuration, the hydrogen transmitting material 441 is palladium, vanadium, tantalum, niobium, zirconium, or the like.

As for installation places of the hydrogen absorption chamber 440, the hydrogen transmitting material 441, and the hydrogen absorption material 90 in the above-described configuration, they may be installed anywhere as long as the place is on the pressure guide wall face 411. Furthermore, the hydrogen absorption material 90 may be powdered, solid, or cylindrical. Or the hydrogen absorption material 90 may be plated or sputtered on an inner wall of the hydrogen absorption chamber 440.

<<Embodiment 4>>

In an embodiment 4, a method of constituting a part or all of the constituent materials with the hydrogen absorption material will be described.

In the present embodiment, the hydrogen absorption material 90 is used as a part or all of the constituent materials such as the substitution device unit 10 and the capillary unit 20. As a result, parts separately assembled into the ordinary pressure/differential pressure transmitter for the purpose of hydrogen absorption can be made unnecessary.

Owing to the above-described configuration, it is possible to prevent pressure rise within the pressure guide paths 60 caused by conversion of hydrogen and hydrocarbons to air bubbles, by absorbing hydrogen transmitted from the external of the differential pressure transmitter 40 or internally generated hydrogen and hydrogen atoms in hydrocarbons with the hydrogen absorption material 90. The same is true of the pressure transmitter 200 as well.

The invention claimed is:

1. A pressure/differential pressure transmitter comprising:
   a diaphragm;
   a pressure receiving chamber wall face;
   a space formed between the diaphragm and the pressure receiving chamber wall face;
   pressure guide paths connected to the pressure receiving chamber wall face;
   a sealed liquid sealed in the space and the pressure guide paths to transmit a pressure received by the diaphragm to a sensor; and
   a hydrogen absorption material provided at least in the sealed liquid, on the pressure receiving chamber wall face, or in a part of a path between the pressure receiving chamber wall face and the sensor, to absorb hydrogen atoms in the sealed liquid;
   wherein alkyl groups and/or hydrocarbon compounds are formed in the sealed liquid as a result of radiation,
   the alkyl groups and/or hydrocarbon compounds are dissociated to hydrogen,
   the hydrogen is absorbed by the hydrogen absorption material, and
   a carbon of the alkyl groups and/or the hydrocarbon compounds is absorbed to the surface of the hydrogen absorption material.

2. The pressure/differential pressure transmitter according to claim 1, wherein hydrogen which has entered into the pressure/differential pressure transmitter from external or internally generated hydrogen atoms are absorbed by the hydrogen absorption material.

3. The pressure/differential pressure transmitter according to claim 1, wherein the hydrogen absorption material is palladium, magnesium, vanadium, titanium, manganese, zirconium, nickel, niobium, cobalt, calcium, or an alloy of the cited elements.

4. The pressure/differential pressure transmitter according to claim 3, wherein the hydrogen absorption material is powdered, solid, cylindrical, or a film.

5. The pressure/differential pressure transmitter according to claim 3, wherein the hydrogen absorption material is formed as a hydrogen absorption alloy, and a powder particle thereof is 0.1 µm or less in diameter.

6. The pressure/differential pressure transmitter according to claim 1, wherein the pressure/differential pressure transmitter is configured to measure a pressure difference between a high pressure side and a low pressure side, the diaphragm is configured as two pairs of first diaphragms which receive pressures of a measurement fluid and two pairs of second diaphragms which receive pressures from the first diaphragms, the sealed liquid is configured to transfer pressures received by the first diaphragms and transfer pressures received by the second diaphragms, the sensor is configured to detect a difference between the transferred pressures of the measurement fluid respectively of the first diaphragms, a circuit is configured to amplify a signal from the sensor, and the hydrogen absorption material is provided within the pressure guide paths, on wall faces of the pressure guide paths, on main body side wall faces of the first diaphragms, on sealed liquid sides of the first diaphragms, or on the second diaphragms, or in places obtained by combining the cited places.

7. The pressure/differential pressure transmitter according to claim 6, wherein third diaphragms and fourth diaphragms are provided between the first diaphragms and the second diaphragms, and the hydrogen absorption material is provided on pressure receiving sides of the third diaphragms, sealed liquid sides of the third diaphragms, pressure receiving sides of the fourth diaphragms, or sealed sides of the fourth diaphragms, or in places by combining the cited places.

8. The pressure/differential pressure transmitter according to claim 6, wherein a powdered hydrogen absorption material, a solid hydrogen absorption material, or a cylindrical hydrogen absorption material functioning as the hydrogen absorption material is sealed and/or attached within the pressure guide paths.

9. The pressure/differential pressure transmitter according to claim 6, wherein a thin film functioning as the hydrogen absorption material is attached to a wall face in the pressure guide paths.

10. The pressure /differential pressure transmitter according to claim 6, wherein a thin film functioning as the hydrogen absorption material is attached to wall faces of the first diaphragms, the second diaphragms, the third diaphragms, and the fourth diaphragms.

11. The pressure/differential pressure transmitter according to claim 1, comprising:

a hydrogen transmitting material installed in a place in contact with the sealed liquid;

a hydrogen absorption chamber installed so as to cover the hydrogen transmitting material; and an opening/closing lid installed on a top wall face of the hydrogen absorption chamber, wherein the hydrogen absorption material is provided within the hydrogen absorption chamber.

12. The pressure/differential pressure transmitter according to claim 11, wherein the hydrogen transmitting material is attached to a wall face of the pressure guide path, a main body side wall face of the diaphragm, a pressure receiving side wall face of a second diaphragm, or a main body side wall face of the second diaphragm, or to places obtained by combining the cited places.

13. The pressure/differential pressure transmitter according to claim 11, wherein the hydrogen absorption material can be taken out and exchanged by opening the opening/closing lid on the top wall face of the hydrogen absorption chamber.

14. The pressure/differential pressure transmitter according to claim 11, wherein a part or all of constituent materials of the pressure guide paths is constituted by the hydrogen absorption material.

15. The pressure/differential pressure transmitter according to claim 1, wherein the hydrogen absorption material absorbs hydrogen atoms generated by radiation decomposition of the sealed liquid.

16. The pressure/differential pressure transmitter according to claim 15, wherein the hydrogen absorption material is disposed to suppress bonding between a positive electrolytic dissociation substance and a negative electrolytic dissociation substance existing in the sealed liquid.

17. A pressure/differential pressure transmission method comprising:

transferring a pressure received by a diaphragm to a first sealed liquid in a space formed between the diaphragm and the pressure receiving chamber wall face;

transferring the pressure transferred to the space, to a second sealed liquid in pressure guide paths connected to the pressure receiving chamber wall face; and providing a hydrogen absorption material on the pressure receiving chamber wall face or in a part of a path between the pressure receiving chamber wall face and a sensor to suppress generation of hydrogen in at least a part of the first and/or second sealed liquid between the pressure receiving chamber wall face and the sensor in detection of a pressure or a differential pressure;

wherein alkyl groups and/or hydrocarbon compounds are formed in the first and/or second sealed liquid as a result of radiation, the alkyl groups and/or hydrocarbon compounds are dissociated to hydrogen, the hydrogen is absorbed by the hydrogen absorption material, and a carbon of the alkyl groups and/or the hydrocarbon compounds is absorbed to the surface of the hydrogen absorption material.

18. A pressure/differential pressure transmitter configured to measure a pressure difference between a high pressure side and a low pressure side, the pressure/differential pressure transmitter comprising:

first and second pressure receiving diaphragms each of which receive pressures of a measurement fluid;

first and second pressure receiving chamber wall faces;

the first pressure receiving diaphragm arranged to form a first space between the first pressure receiving diaphragm and the first pressure receiving chamber wall face;

the second pressure receiving diaphragm arranged to form a second space between the second pressure receiving diaphragm and the second pressure receiving chamber wall face;

pressure guide paths connected to each pressure receiving chamber wall face, the pressure guide paths having walls;

a sensor;

third and fourth diaphragms;

the third diaphragm positioned along the guide path between the first pressure receiving wall face and the sensor, the third diaphragm receiving pressures from the first pressure receiving diaphragm;

the fourth diaphragm positioned along the guide path between the second pressure receiving wall face and the sensor, the fourth diaphragm receiving pressures from the second pressure receiving diaphragm;

a sealed liquid sealed in the first and second spaces and the pressure guide paths and configured to transmit a pressure received by the first and second pressure receiving diaphragms and the third and fourth diaphragms to a sensor;

the sensor configured to detect a difference between the transmitted pressure of the measurement fluid at the first pressure receiving diaphragm and the transmitted pressure of the measurement fluid at the second pressure receiving diaphragm; and a hydrogen absorption material provided in or on at least one of the sealed liquid, the first and second pressure receiving chamber wall faces, a part of the pressure guide paths between the first and second pressure receiving chamber wall faces and the sensor, the first and second pressure receiving diaphragm, or the third and fourth diaphragms, to absorb hydrogen atoms in the sealed liquid.

19. A pressure/differential pressure transmitter comprising:

a diaphragm;

a pressure receiving chamber wall face;

a space formed between the diaphragm and the pressure receiving chamber wall face;

pressure guide paths connected to the pressure receiving chamber wall face;

a sealed liquid sealed in the space and the pressure guide paths to transmit a pressure received by the diaphragm to a sensor; and a hydrogen absorption material provided in the pressure guide paths between the pressure receiving chamber wall face and the sensor, to absorb hydrogen atoms in the sealed liquid, wherein the hydrogen absorption material comprises a metal and functions as a dissociation substance.

* * * * *